US009241500B2

(12) United States Patent
Nair et al.

(10) Patent No.: US 9,241,500 B2
(45) Date of Patent: *Jan. 26, 2016

(54) STEEPED COCOA COMPOSITIONS AND FUNCTIONAL COCOA BEVERAGES MADE FROM THEM

(71) Applicants: Malathy Nair, Hershey, PA (US); Tim J. Kohr, Myerstown, PA (US); Krista L. Cessna, Hummelstown, PA (US); Sharon Cin, Hummelstown, PA (US); William Jeffrey Hurst, Mt. Gretna, PA (US); Ashley L. Boldt, Harrisburg, PA (US); Gregory T. Zerphy, Elizabethtown, PA (US); Brian S. Baker, Millersburg, PA (US); B. Douglas Brown, Hershey, PA (US)

(72) Inventors: Malathy Nair, Hershey, PA (US); Tim J. Kohr, Myerstown, PA (US); Krista L. Cessna, Hummelstown, PA (US); Sharon Cin, Hummelstown, PA (US); William Jeffrey Hurst, Mt. Gretna, PA (US); Ashley L. Boldt, Harrisburg, PA (US); Gregory T. Zerphy, Elizabethtown, PA (US); Brian S. Baker, Millersburg, PA (US); B. Douglas Brown, Hershey, PA (US)

(73) Assignee: The Hershey Company, Hershey, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/462,027

(22) Filed: Aug. 18, 2014

(65) Prior Publication Data

US 2015/0099037 A1    Apr. 9, 2015

Related U.S. Application Data

(60) Division of application No. 13/079,649, filed on Apr. 4, 2011, now abandoned, which is a continuation-in-part of application No. 11/717,163, filed on Mar. 13, 2007, now Pat. No. 7,919,135, and a continuation-in-part of application No. 11/717,165, filed on Mar. 13, 2007, now abandoned.

(60) Provisional application No. 60/781,327, filed on Mar. 13, 2006, provisional application No. 60/872,515, filed on Dec. 4, 2006.

(51) Int. Cl.
| A23L 2/38 | (2006.01) |
| A23G 1/56 | (2006.01) |
| A23L 1/30 | (2006.01) |
| A23L 1/302 | (2006.01) |
| A23L 2/02 | (2006.01) |
| A23L 2/52 | (2006.01) |

(52) U.S. Cl.
CPC ... *A23G 1/56* (2013.01); *A23L 1/30* (2013.01); *A23L 1/3002* (2013.01); *A23L 1/302* (2013.01); *A23L 2/02* (2013.01); *A23L 2/38* (2013.01); *A23L 2/52* (2013.01); *A23V 2002/00* (2013.01)

(58) Field of Classification Search
CPC ........................................................ A23L 2/02
USPC ................................ 426/59, 72, 74, 573, 593
See application file for complete search history.

(56) References Cited

U.S. PATENT DOCUMENTS

| 3,982,042 A | 9/1976 | Arden |
| 4,208,440 A | 6/1980 | Schmidt |
| 5,139,799 A | 8/1992 | Palson et al. |
| 5,389,394 A | 2/1995 | Weyersbach et al. |
| 5,480,657 A | 1/1996 | Allen |
| 5,552,164 A | 9/1996 | Kuipers et al. |
| 6,673,379 B2 | 1/2004 | Kealey et al. |
| 6,900,241 B2 | 5/2005 | Romanczyk et al. |
| 7,919,135 B2 * | 4/2011 | Nair et al. ............. 426/593 |
| 2005/0266138 A1 | 12/2005 | Yuan et al. |
| 2006/0034999 A1 | 2/2006 | Hino et al. |
| 2006/0257525 A1 | 11/2006 | Hearn |
| 2007/0085059 A1 | 4/2007 | Mora-Gutierrez et al. |

FOREIGN PATENT DOCUMENTS

| EP | 1149845 A2 | 10/2001 |
| EP | 1537790 A1 | 6/2005 |
| EP | 1618791 A1 | 1/2006 |
| JP | H03-094640 A | 4/1991 |
| JP | H07-79749 A | 3/1995 |
| WO | 02/065859 A1 | 8/2002 |
| WO | 03/045157 A1 | 6/2003 |
| WO | 2005/013707 A1 | 2/2005 |
| WO | 2005/115160 A1 | 12/2005 |

OTHER PUBLICATIONS

Banks et al., "Effect of alcohol content on emulsion stability of cream liqueurs," Food Chem., 1985, 18(2):139-52 (Abstract).
Bee, R.D. et al., "The Morphology of Black Tea Cream," Food Microstructure, 1987, 6(1):47-56 (Abstract).
Buffo, R. et al., "Beverage emulsions and the utilization of gum acacia as emulsifier/stabilizer," Perfumer & Flavorist, 2000, 25(4):25-30, 32, 34, 36-28, 40-42, 44 (Abstract).

(Continued)

*Primary Examiner* — Helen F Heggestad
(74) *Attorney, Agent, or Firm* — David Kulik; Williams Mullen PC

(57) ABSTRACT

The invention provides, in one aspect, a method of producing a cocoa-containing beverage, or a nutritionally fortified or energy-sustaining cocoa beverage, containing beneficial cocoa polyphenols. Ready-to-drink compositions, concentrates, primary beverage components, and packets for producing the beverages are specifically disclosed and prepared from a cocoa water composition made from steeping a cocoa-containing product in water or an aqueous solution with an acid. A number of vitamins, minerals, supplements, and nutriceutical compositions can be added.

22 Claims, No Drawings

(56) References Cited

OTHER PUBLICATIONS

Buffo, R. et al., "Shelf-life and mechanisms of destabilization in dilute beverage emulsions," Flavour and Fragrance Journal, 2001, 16(1):7-12.
Chao, Y.C. et al., "The roles of catechins and caffeine in cream formation in a semi-fermented tea," Journal of the Science of Food and Agriculture, Sep. 1999, 79(12):1687-1690 (Abstract).
Charlton, A.J. et al., "The self-association of the black team polyphenol theaflavin and its complexation with caffeine," Perkin 2, 2000, No. 2, pp. 317-322 (Abstract).
Dickinson, E. et al., "Stability of alcohol-containing emulsions in relation to neck-plug formation in commercial cream liqueurs," Food Hydrocolloids, 1989, 3(2):85-100 ((Abstract).
Dickinson, E. et al., "Stability of cream liqueurs containing low-molecular-weight surfactants," J. Food Sci., 1989, 54(1)17-81 (Abstract).
Farmer, F.M., "The Boston Cooking-School Cook Book," 1896, pp. 43-44.
Huang, J. et al., "Cream forming during instant tea processing and its effect on solubility," Shipin Gongye Keji, 2003, 24(8):32-34.
Imagawa, H. et al., "Purification of tannase of *Aspergillus niger* and its effect on the creaming of tea infusion," Nippon Shokuhin Kogyo Gakkaishi, 1975, 22(9):443-9.
Jobstl, E. et al., "Creaming in black tea," Journal of Agricultural and Food Chemistry, Oct. 5, 2005, 53(20):7997-8002 (Abstract).
Kong, Y. et al., "Ring formation and emulsion texture and stability in a food-beverage system," Journal of Dispersion Science and Technology, 2006, 27(5):579-585 (Abstract).
Kosuga, M., "Creaming of extracted tea on cooling," Wayo Joshi Daigaku Kiyo, Kaseikei-hen, 1998,38:43-55.
Liang, Y. et al., "Comparative study of cream in infusions of black tea and green tea (*Camellia sinensis* (L.) O. Kuntze)," International Journal of Food Science and Technology, Aug. 2002, 37(6):627-634.
Liang, Y. et al., Effect of extraction temperature on cream and extractability of black tea (*Camellia sinensis* (L.) O. Kuntze), International Journal of Food Science and Technology, Jan. 2003, 38(1):37-45 (Abstract).
Meseck, S. et al., "Beverage emulsions: composition, requirements and applications," Fluessiges Obst, 69 (8):512-517.
Norman, L.W. et al., "Cationic polymers help separate prelimer suspended solids," Journal of Sugar Beet Research, 1993, 30(1-2):110 (Abstract).
Powell, C. et al., "Tea cream formation: the contribution of black tea phenolic pigments determined by HPLC," Journal of the Science of Food and Agriculture, 1993, 63(1):77-86 (Abstract).
Reiter, M. et al., "The role of process technology in carrot juice cloud stability," Lebensmittel-Wissenschaft and Technologie, 2003, 36(2):165-172 (Abstract).
Sahelian, R., "Polyphenols supplement research study," www.raysahelian.html, May 14, 2005, pp. 1-7.
Sanchez, C.C. et al., "Dynamic phenomena in caseinate-monoglyceride mixed films at the air-water interface," Food Hydrocolloids, May 2005, 19(3):395-405 (Abstract).
Taherian, A.R. et al., "Effect of added oil and modified starch on rheological properties, droplet size distribution, opacity and stability of beverage cloud emulsions," Journal of Food Engineering, Dec. 2006, 77(3):687-696 (Abstract).
Takahashi, F. et al., "Effect of calcium treatment on the cream-down of black tea infusion," Rakuno Kagaku, Shokuhin no Kenkyu,1995, 44(3):A107-A112.
Takino, Y. et al., "Effect of tannase-treatment on the creaming of black tea infusion," Nippon Shokuhin Kogyo Gakkaishi, 1975, 22(6):286-91.
Tan, C-T. et al., "Stability of beverage flavor emulsions," Perfumer & Flavorist, 1988, 13(1):23-43 (Abstract).
Van Vliet, T. et al., "Weak Particle Networks," Food Colloids, Bee, R.D., Richmond, P., Mingins, J., Eds, Royal Society of Chemistry, Cambridge, UK, pp. 206-217, (1989).
Ye, A. et al., "Influence of sodium chloride addition on the properties of emulsions formed with commercial calcium caseinate," Food Chemistry, May 2000, 69(3):237-244 (Abstract).
International Search Report and Written Opinion, mailed Aug. 5, 2008, in International Application No. PCT/US07/06284, filed Aug. 13, 2007.

\* cited by examiner

STEEPED COCOA COMPOSITIONS AND FUNCTIONAL COCOA BEVERAGES MADE FROM THEM

REFERENCE TO RELATED APPLICATIONS

This application is a divisional of U.S. Ser. No. 13/079,649 filed Apr. 4, 2011 (abandoned), which is a continuation-in-part of prior U.S. application Ser. No. 11/717,163 (now U.S. Pat. No. 7,919,135), and Ser. No. 11/717,165 filed Mar. 13, 2007 (abandoned), both of which claim priority to U.S. Provisional applications 60/781,327, filed Mar. 13, 2006, and 60/872,515, filed Dec. 5, 2006. The entire contents of each of these documents are hereby incorporated by reference.

FIELD OF THE INVENTION AND INTRODUCTION

The invention relates to new beverage products made from water steeped in a cocoa product or powder as well as combinations of this beverage with one or more functional or healthful ingredients, such as energy-producing, stimulating, immune-defense, heart health, detoxifying, muscle recuperating, cognition enhancing, or relaxing ingredients or supplements, for example. In general, the beverages contain a percentage of a cocoa water ingredient having beneficial or significant levels of cocoa antioxidants, optionally in combination with one or more vitamins, extracts, or nutriceuticals known in the art. The preferred fortified, refreshing, and/or energy-sustaining beverages of the invention can be produced as a ready-to-drink product, a concentrate, or as a mix or packet to produce a beverage. In preferred and advantageous embodiments, the beverages can be produced as a tea-type drink, a flavored or enhanced water drink, a juice cocktail-type drink, or an energy drink, and may optionally contain healthy ingredients in addition to the beneficial cocoa antioxidants and energy-producing ingredients. In other advantageous aspects, the methods of the invention permit effective filtering and processing of a cocoa/water mixture as well as options to reduce or substantially reduce the appearance of a surface fat ring, or cocoa fat ring, commonly present in the beverage containers of fat-containing compositions upon storage.

RELEVANCE OF THE INVENTION AND DESCRIPTION OF RELATED ART

A variety of cocoa beverages have been available. Almost exclusively, however, these products employ a milk or liquor base to dissolve the cocoa or maintain the cocoa solids in solution. Immediate examples include chocolate milk and cocoa or chocolate liqueurs. However, as more and more evidence shows the benefit of cocoa antioxidants or cocoa polyphenol compounds, a variety of food products with these compounds are desirable. The invention, in one aspect, addresses this desire by combining conventional tea steeping processes with cocoa polyphenol-containing products, concentrates or extracts to produce a refreshing cocoa beverage that optionally includes energizing and/or stimulating ingredients. In another aspect, the invention addresses the problem of filtering a mixture of a cocoa product and water or aqueous solution, as prior methods were prone to clogging and inefficiencies that prevent commercial production. In yet another aspect, the invention addresses the problem of fat rings commonly found in the container or at the surface of a beverage containing fat, such as the fat of cocoa butter.

Also, various energy drinks and infused or fortified teas have been marketed or suggested. However, due to at least the technical problems in using cocoa products in steeping processes, none of these tea products have been based upon cocoa as a basic ingredient. Furthermore, the desire for products containing cocoa antioxidants has increased, and therefore the art is in need of improved beverage products based upon cocoa.

BRIEF SUMMARY OF THE INVENTION

The present invention relates to beverages made from steeped cocoa or what is referred to as "cocoa water," which can be produced from cocoa products such as cocoa extracts, cocoa concentrates, cocoa powder, cacao nibs, or other cacao bean compositions. In one aspect, the invention relates to novel methods for making and the novel use of a steeped or brewed cocoa water as described herein. In a preferred embodiment the invention provides a method for producing a refreshing beverage containing cocoa flavor compounds and cocoa polyphenols, and which in certain optional embodiments contain substantially zero calories and/or fat or is a low calorie beverage. In another aspect, the cocoa water can be produced from a method of steeping cocoa products and filtering or removing solids or particulates, and then optionally combining this cocoa water with a juice or extract, such as a fruit, herbal, or vegetable juice or extract, that provides nutritional elements and reduces the astringency or bitterness commonly present in a cocoa composition. The cocoa water component itself provides a novel, refreshing base and contains cocoa flavor compounds and cocoa polyphenols, which can be the base material for a number of mixed beverage compositions or a primary beverage component. Combinations of coca water with fruit juices and/or extracts, or multiple fruit juices and/or extracts, are especially preferred in this regard, however the cocoa water can be mixed with sweeteners and water or tea or other beverage to produce a tea-type beverage also. In preferred embodiments, the cocoa water contains no detectable solid or particulate matter as determined by conventional beverage tasting methods, such as taste tests. In other preferred embodiments, the cocoa water contains no detectable particles over 50 microns in diameter, or has substantially no particles above 50 microns in diameter, or substantially no particles above 20 microns, or above 10 microns, or above 5 microns in diameter. Certain optional embodiments contain substantially zero calories and/or fat or can be a low calorie beverage. The beverage can be sealed in a container for commercial distribution and be shelf-stable for about 1 to about 9 months, or more than 9 months, or at least six months at room temperature. A variety of filtering, irradiating, heating, centrifugation, or treatment methods, or a combination of these, can be used to produce a beverage capable of stable storage over a period of time. Other similar or compatible methods known or available in the art can also be used.

The method for producing the cocoa water can include the use of purified or sterilized water at certain temperatures, or at a number of desired temperatures or ranges in temperature. However, any potable water or even flavored or carbonated water can be used. Filtering or purifying methods to remove insoluble components, or most of or substantially all of the insoluble components can be used, as known in the art. Preferred water includes carbon filtered water, deionized water, and/or water purified by reverse osmosis. In addition, aqueous solutions can be used, such as buffered aqueous solutions of citric acid, more preferably about 0.1 to about 1.0% citric acid, or about 0.4% to about 0.7%, or about 0.6% citric acid at about pH 4 or below, or between about pH 3 and pH 4. An aqueous solution prepared from water previously mixed with cocoa nibs can also be used. The use of this cocoa nib-treated water can provide additional cocoa flavoring, and the cocoa nib-treated water can also be free of fat and/or substantially free of calories. After steeping the water or aqueous solution with the cocoa product, the water is filtered or purified to produce a ready-to-drink beverage base referred to as cocoa water. An optional filtering or clarifying filter process to prepare an essentially colorless cocoa water can also be used in certain embodiments, and various beverage and juice filtration systems are available for this purpose. The cocoa water can optionally be concentrated by methods known in the art, and then used by adding water and optionally sweeteners and/or flavorings to produce a ready-to-drink product.

As noted, the cocoa water can be used as a base and one or more functional ingredients added to produce a final beverage or an ingredient for a food or beverage. Thus, the invention encompasses many different cocoa-based compositions and products and the methods for producing them.

In certain preferred embodiments, the base cocoa water composition is used with one or more fruit juices, which here encompasses fruit-based products and fruit juice concentrates and/or fruit extracts and/or essence of fruits or extracts. Any available fruit can be used for these juices, concentrates, or extracts, as well as any combination of two or more. However, preferred examples include: citrus fruits; orange; tangerine; cranberry; pomegranate; black currant; blueberry; grape; concord grape; white grape; pear; and apple. Additional fruits are listed below and throughout this document and its examples. Surprisingly, the combination of a fruit juice and the cocoa water provides a refreshing flavor that masks or blocks the sometimes bitter or astringent flavors in the cocoa water itself. Generally, the cocoa water concentrations in the final beverage are about 5% to about 10%, or about 10% to about 20%, or about 10% to about 60%, and the optional fruit juice is about 8% to about 40%. As noted below and throughout this document, many other ranges or specific beverages can be selected and used.

In other embodiments, a tea or tea product can, alternatively or additionally, be added to the cocoa water to produce a beverage. Various teas can be selected for use, including green tea, white tea, and any available tea blends. Similarly, elixirs, extracts and/or antioxidant preparations can be used as an additive in the beverages, such as extracts of green tea, white tea, cacao beans or nibs, grapeseed, blueberries, raspberries, black currant, cranberries, Japanese knotweed, or other antioxidant-containing food product, botanical, or other source.

In other energy-providing examples or in any of the examples discussed here, caffeine, theobromine, guarana, taurine, and other compounds can be present or added to the beverage.

In another aspect, the beverages include one or more flavors or flavor combinations or mixes, especially those compatible with beverages or what is known as beverage flavors. The flavors are compatible with the cocoa water base of the beverages and can be selected from those commonly used with cocoa and chocolate products, for example, and/or tea products. A concentrated plant extract, or essence, can also be used and refers to a concentrated plant extract containing its unique flavor and fragrance and capable of being used in a food, beverage, or for human consumption.

In another aspect, the invention comprises packets or dried beverage components for producing a beverage or composition of the invention. The packets can be similar to tea bags and can be submerged in water for steeping, as desired. The dried beverage components can be produced from conventional or available drying, spray drying, or concentrating processes of the art.

Preferably, the methods and products use natural cocoa or extracts that are not treated with alkaline, a process also known as "Dutching." However, as noted, a variety of cocoa powders, cocoa extracts, cocoa concentrates, cocoa compositions, and cacao bean compositions are known and available to one of skill in the art and can be selected for use in any aspect of the invention. In addition, cocoa products or extracts with enhanced levels of cocoa polyphenols or cocoa flavanols, or extracts with additives, can also be selected for use. Defatted or non-fat cocoa products, such as defatted cocoa powder, can also be used alone or with other cocoa products. Furthermore, combinations of available cocoa powders, extracts, enhanced extracts, concentrates, extracts with additives can be selected and used for any aspect of the invention. The terms "cocoa powder," "cocoa extract," and "cocoa bean composition" for steeping, thus, can be any of a variety of products and combinations as well as specific combinations of the cacao bean-derived products noted in this disclosure.

In particularly preferred embodiments, the invention comprises beverages that contain efficacious flavanols, flavanoids, polyphenols, antioxidants, cocoa polyphenols and/or cocoa antioxidants and/or other cocoa-derived compounds or compositions. These beverages can be used in a healthy diet, for example a diet to improve cardiovascular conditions or prevent cardiovascular disease or maintain weight. Another aspect of the invention is to provide a cocoa beverage composition that is a sugar-free and/or calorie-free cocoa beverage. Yet another aspect of the invention is to provide a cocoa beverage that is sugar-free and/or calorie-free and optionally contains other available or known supplements, active ingredients, appetite suppressing agents, and similar agents or ingredients, especially those also found in antioxidant-containing foods, herbs, teas, coffees, or food product ingredients. Further, the beverage or packet composition may also or in addition be combined with one or more other dietary nutrients, such as vitamins, minerals, amino acids, etc., to provide a nutritional or dietary supplement. Any of these combinations of the invention can advantageously provide benefits to human health and capture additional beneficial effects. Also, all of the ingredients or combinations may be combined with appropriate stabilizers, emulsifiers, preservatives, binders, carageenans, and other edible or ingestible compounds known to one of skill in the art in the industry to produce a packet or beverage.

In addition, the invention includes methods of selecting appropriate combinations of cocoa products, conditions, manufacturing steps, or additives or ingredients to produce a shelf-stable product, and particularly a product capable of being stored as a ready-to-drink beverage in a container for at least one month at room temperature, or at least two months at room temperature, or at least three months at room temperature, or at least six months at room temperature. In a similar aspect, the invention includes methods to produce a cocoa water composition, and the compositions themselves, whereby the propensity to form a fat ring on a storage container of the cocoa water or a final product is substantially reduced or minimized. In particular, the invention includes the use of acidifying conditions or low pH buffering additives, such as citric acid, lactic acid and/or phosphoric acid compounds or combinations, used at one or more steps in the production process. Preferably, a pH of about 3.5 or below can substantially reduce the appearance of a fat ring on the container after storage. Filtration steps, filter aids, centrifugation steps, and settling time, all at selected or different temperatures, can substantially reduce the appearance of a fat ring. Additionally, the use of low fat cocoa powder, with about 1.2% fat, can reduce the appearance of a fat ring. In general, low fat cocoa powder contains lees than 10% cocoa butter, and defatted cocoa powder contains less than 2% cocoa butter. The use of defatted cocoa powder combined with an acid additive is one preferred method for reducing the fat ring, but any cocoa powder, or cocoa product, that is defatted or low in fat can be used alone or in combination with other cocoa products. The use of defatted cocoa powder combined with an acid additive is one preferred method for reducing the fat ring, but any cocoa powder, or cocoa product, that is defatted or low fat can be used alone or in combination with other cocoa products. The products and the methods of the invention can, in any embodiment, also include aseptic processing, for example treatments of the water or aqueous solution, the cocoa product-water mixture, and/or the final steeped product. Beverage emulsifiers, beverage stabilizers, weighting agents, thickeners can also be added, and a preferred group is polysorbates, carrageenans, Tween 60, Tween 80, and gum arabic. Additional methods provide for selecting particular cocoa compositions, conditions for steeping, water, and other optional ingredients to optimize the taste, mouthfeel, or acidity of the ready-to-drink product.

Throughout this disclosure, applicants refer to journal articles, patent documents, published references, web pages, and other sources of information. One skilled in the art can use the entire contents of any of the cited sources of information to make and use aspects of this invention. Each and every cited source of information is specifically incorporated herein by reference in its entirety. Portions of these sources may be included in this document as allowed or required. However, the meaning of any term or phrase specifically defined or explained in this disclosure shall not be modified by the content of any of the sources. The description and examples that follow are merely exemplary of the scope of this invention and content of this disclosure and do not limit the scope of the invention. In fact, one skilled in the art can devise and construct numerous modifications to the examples listed below without departing from the scope of this invention.

DETAILED DESCRIPTION OF EXEMPLARY EMBODIMENTS

In general and as used in this invention, the various cocoa-containing extracts, products or compositions noted here refer to the terms as used in Minifie (Chocolate, Cocoa, and Confectionery, 3d ed., Aspen Publishers), specifically incorporated herein by reference. The cocoa-containing product used to produce a cocoa water can be a cocoa powder, such as natural cocoa powder, dutched cocoa powder, extra fine or finely ground cocoa powder having average particle sizes less than 30 microns, low fat or non-fat cocoa powder, unroasted cocoa powder, underfermented cocoa powder, unfermented cocoa powder, low roasted cocoa powder, heavily roasted cocoa powder, cocoa products produced from unfermented cacao nibs, cocoa products produced from unroasted cacao nibs, any of these products as an extra fine or finely ground cocoa product or powder having average particle sizes less than 30 microns, or less than 10 microns, or even less than 5 microns, and any combination of these cocoa products or powders. Preferably, a finely ground, low to medium roast cocoa powder is selected. However, in another preferred embodiment, cocoa powder from fermented and heavily roasted, or very dark roast, beans can be used. In addition, various types of defatted or low fat or substantially fat free cocoa powders can be selected and used, such as one or more from the above in a defatted or low fat or fat free state. One skilled in the art is familiar with the different degrees of roasting possible and the use of hygrometers or equilibrium relative humidity measurements to compare the degree of roasting. The cocoa-containing product can also be selected from one or more of: cocoa extracts containing flavanols, baking chocolate, chocolate liquor, cocoa extracts, cacao beans, cacao nibs, cocoa kibble, semisweet chocolate, bittersweet chocolate, and milk chocolate. The invention relates to food products and methods of producing or manufacturing food products that provide healthful benefits of the natural antioxidants found in cocoa and chocolate.

The juices, concentrates of a juice, extracts, elixirs or fruit flavor of any one or more of the following can be used, as well as any other available edible juice or extract: citrus fruits; berries; orange; lemon; lime; tangerine; mandarin; grapefruit; acerola; grape; pear; passion fruit; pineapple; banana; apple; cranberry; cherry; raspberry; chokeberry; grapeseed; peach; plum; grape; currant; black currant; cranberry; blackberry; blueberry; pomegranate; acai; noni; elderberry; goji berry; rosehips; bilberry; hawthorne berry; ginko; gotu kola; rooibos; boysenberry; catuaba; horny goat weed; yohimbe; damiana; red raspberry leaf; vitex berry; blessed thistle; wolfberry; strawberry; mirabelle; watermelon; honeydew; cantaloupe; mango; papaya; botanical flavors derived from cola; tea; white tea; green tea; coffee; vanilla; almond; vegetables; tomato; cabbage; celery; cucumber; spinach; carrot; lettuce; watercress; dandelion; rhubarb; beet; cocona; guava; Japanese knotweed; han guo. Specific mixtures of these including two component, three component and four component mixtures as shown in the examples can also be selected and used.

The compositions and beverages of the invention will be, in most cases, cocoa polyphenol-containing beverages and compositions and are generally produced from natural cocoa products, such as cocoa nibs, cocoa kibble, or cocoa powder, or a product resulting from pressing the lipid content from fermented and roasted cacao bean nibs. However, unroasted and/or unfermented cacao nibs or beans or cocoa products made from them can also be used to produce the compositions and beverages of the invention, and several unroasted and/or unfermented cacao products are available for use. In particular, unroasted and unfermented cacao nibs or beans that have been briefly heat-treated or blanched can be used to produce a cocoa powder or other cocoa products that contain high levels of cocoa polyphenols, and the powders, extracts, and concentrates from these unroasted and unfermented beans can be used in particular embodiments of the invention. As used herein, a "brewed cocoa water composition" can be any of the specific cocoa brew, steeped cocoa, or cocoa water compositions described, as well as concentrates and purified preparations of any of these compositions. As it is produced from a cocoa nib, bean, or composition, the brewed cocoa water composition will contain cocoa antioxidants and cocoa polyphenols and other cocoa nutrients and beneficial compounds. The preferred brewed cocoa water composition will have substantially all of the solid particulates less than 50 microns, or less than 30 microns, or less than 10 microns, or even less than 5 microns removed. As used herein, the terms "cocoa powder," "cocoa bean compositions," and "cocoa products" are essentially interchangeable and mean a product from a cacao bean, regardless of the method or treatment employed to produce the powder, composition or product. In addition, combinations of cocoa products or cocoa powders, produced from different types of cacao beans or from different bean processing methods or conditions, can be used. The natural cocoa powders, cocoa powders and products from unroasted and/or unfermented cacao beans all contain cocoa polyphenols. Approximately 10-25% of the lipid fraction (cocoa butter) is retained in natural cocoa, and all or a percentage of the fat can be removed from any of these powders or products. Furthermore, the preferred cocoa powders, cocoa bean compositions, and cocoa products for use with the invention are not treated with alkaline, a process also known as "Dutching." Other cocoa products, such as breakfast cocoa and chocolate liquor can be used. As one of skill in the art understands, a certain amount or percentage of cocoa solids in a food ingredient can be achieved, inter alia, by using or adding an amount of cocoa powder, chocolate liquor, or other chocolate or cocoa ingredient containing the requisite amount of cocoa solids. Similarly, a certain amount or percentage of natural cocoa in a food ingredient can be achieved, inter alia, by using or adding an amount of cocoa powder, chocolate liquor or other chocolate or cocoa ingredient. In addition, while a cocoa containing product having a particular antioxidant or polyphenol level is not required, the invention encompasses the use of cocoa containing products with enhanced, altered, or increased levels of antioxidants or polyphenol compounds as compared to conventional cocoa containing products. A variety of production methods, extraction methods, and the addition of extracts or cocoa-derived polyphenols have been mentioned and can be used by one of ordinary skill in the art to create cocoa beverages and compositions of the invention. Other nutritional, therapeutic, or preventative ingredients can be added as well, as known in the art.

With respect to cocoa polyphenols, numerous studies have indicated a strong inverse correlation between heart disease and the consumption of polyphenol-containing compounds (Vita, J. A., Am J Clin Nutr 81(Suppl):292S-7S (2005)). Although cocoa beans and the products thereof have been considered to have health promoting properties for thousands of years, dating back to ancient Central American cultures, recent analytical technologies have allowed for characterization of specific chemistry of the cocoa bean (Hurst, W. J. et al., Nature 418: 289-90 (2002)). Analysis of cocoa, the main product of the cacao bean, indicates that it is highly concentrated in certain polyphenol compounds, specifically in the flavanoid family. The most abundant flavanoids in cocoa are the flavanols, including the monomeric forms of epicatechin and catechin, as well as the oligomeric forms, called procyanidins. The monomeric forms as well as the lower level polymers have been demonstrated to be bioavailable, reaching peak plasma concentrations two hours post-consumption (Baba, S., Free Radic Res 33(5):635-412 (2000)). In preferred examples, the invention comprises beverages, compositions, concentrates, and packets for producing beverages that contain measurable or efficacious amounts of cocoa polyphenols, cocoa flavanols, and/or cocoa antioxidants from the cocoa product steeping process. Additional polyphenols, flavanols, procyanidins, or polymeric form of these compounds, and/or antioxidants can be added. Advantageously, a refreshing and healthy post-exercise beverage of the invention can contain antioxidants, which can help recovery from exertion or muscle fatigue.

In one example of the brewed cocoa water composition that can be used in the invention, it can be produced by steeping warm water from about 20° C. to about 100° C. in a cocoa powder, such as one or more of the following cocoa bean compositions: Hersheys® cocoa powder; a cocoa powder made from unroasted and/or unfermented cocoa beans; a cocoa powder containing less than 3% cocoa fat or total fat; and a cocoa powder from unfermented, unroasted, blanched cocoa beans. The cocoa bean composition used, for example cocoa powder, cocoa nib product, cocoa kibble, or cocoa bean extract or concentrate, can be used at a concentration of about 0.8% to about 60% in water or aqueous solution. The Examples below refer to about a 1-2% cocoa bean composition in water for a relatively light brew, and about 3-4% cocoa bean composition in water for a heavier or rich brew for this cocoa water. However, various amounts of cocoa product can be used in the steeping process to vary the taste and cocoa polyphenol content, and up to about 8% natural cocoa powder is mentioned below. In another example, for a single serving, about 8 oz of water can be combined with about 2 Tblsp of a cocoa powder or cocoa bean composition. After steeping for about 2 to about 5 minutes, the steeped water is filtered through a membrane filter and is ready to drink or be used in preparing the nutritionally fortified cocoa beverages of the invention. It can optionally be cooled prior to further use or processing. Scale-up of this basic process is possible, and various additions to the process and the ingredients used and selected can be made, as discussed below or elsewhere in this disclosure. In another example, the cocoa powder or cocoa bean composition and water mixture can begin with water, or an aqueous solution as noted herein, wherein the water is at about 200° F., followed by a steeping process for about 5 minutes, then the mixture is flash cooled to about 130° F., or any temperature between about 160° F. and about 60° F. A room temperature or 70° F. rest period can also be used, for at least 10 minutes or between about 45 minutes and 2 hours. In yet another example, the cocoa powder or cocoa bean composition is mixed with pH adjusted water at about pH 4-5, or a pH between about pH 3 and about pH 4, and at a temperature of about 135° F. to about 145° F., steeped for about 5 minutes, the centrifuged or clarified by filtration to remove particulates. The cooling or flash cooling or rest period process can be designed to remove substantially all of the cocoa solids from the solution, whereby the resulting mixture can be efficiently filtered. At this stage, the cocoa fat, or substantially all of the total fat present and/or fat complexed with protein, can be removed, such as by skimming the fat layer from the surface, decanting the mixture, and/or by filtering the mixture. The removal of fat can prevent the oil or fat ring sometimes present in beverage containers after storage for a period of time. The substantial removal of the propensity to form a fat ring in a beverage with fat from cocoa products as high as used here is a unexpected and advantageous aspect of the methods of the invention, which results in beverage products with superior storage and appearance characteristics compared to simple steeping process used in a tea production method. Additional benefits of the optional flash cooling or rest period process are the improvement in flavor characteristics. In particular, the flash cooling or other limiting of the time period the cocoa water is heat treated can reduce prune notes in the flavor, reduce the brown coloring, and limit any increase in bitterness or astringency caused by heat treatments. Also, resting at room temperature prior to filtration appears to substantially reduce the appearance of a fat ring. Also, one or more weighting agents or emulsifiers, as known or available in the art, can be added to help solubilize the fat or a fat layer present. An optional homogenization process can be used in conjunction with the added weighting agents and/or emulsifiers, and homogenizing with a gum arabic added is preferred.

Each of these processes for producing cocoa water, and any process of the invention, can be used with an aqueous solution at about pH 4 or between about pH3 and about pH 4, with pH 3.5 especially preferred. Of course, one of skill in the art is familiar with ways to modify a number of the parameters (such as the % cocoa bean composition used to steep; steeping time; stirring or agitation during steeping; temperature of the steeping solution; filtration system used; flash cooling and temperature of flash cooling or resting; pH of water or aqueous solution; and the type of water or aqueous solution used) in order to produce a desired flavor, flavor concentration, color, and/or the total cocoa polyphenol content of a cocoa water, beverage or beverage concentrate of the invention.

The cocoa extract, cocoa powder, concentrate, and/or cocoa bean composition used to steep can be incorporated into a packet or filter packet according to the invention, and thus the invention comprises combinations with packet materials that do not completely disperse in the water and are typically used to brew tea-type beverages. The cocoa extracts or solids should be primarily retained in the packet. In certain embodiments, the filter packet is at least one sheet or face of filter material bonded around its edges to a front or back face of the packet, whereby the water is allowed to flow through the cocoa material. Both sides and even the entire packet can be composed of this filter material to maximize the area available for steeping. The packet can contain from about 2 gm to about 12 gm or more of ground cacao beans or cocoa powder or cocoa extract, or other cocoa product or composition as discussed herein. The packet may also contain flavoring agents and/or additional natural products, such as tea, green tea, or *ginseng*. In preferred examples, the packet is sized and filled or adapted to brew a single serving of cocoa beverage. The cocoa composition used, as with other aspects of the invention, can include other ingredients as discussed herein or as known or available in the brewing or food and beverage art. Further, compressed compositions can be used, such as a compressed cocoa powder or cacao bean extracts, to preserve the freshness and/or reduce the size of the packet. Also, the packet itself may be sized or shaped to fit a particular container, such as a coffee cup or 12 oz cup.

In another embodiment, the method of producing a cocoa water of the invention includes contacting a cocoa powder with purified, carbon filtered, or deionized water for about 30 seconds to about 5 minutes, or even up to 72 hours, at about 80° C. or above, or preferred temperature about 145° F., or anywhere in between about 140° F. to about 185° F. Optionally, an acid, such as citric acid or ascorbic acid lactic acid or phosphoric acid, can be used to adjust the pH, preferably to below 7 and more preferably to about 6.5 or below or about 6.0 or below. In another preferred embodiment, an aqueous solution at about pH 4.6 or below, or about 4.0 or below, or between about pH 3.0 and pH 4.0 can be used with any of the cocoa bean compositions, products or powders. The use of buffered acidic aqueous solutions has the added benefit of preserving the levels of cocoa polyphenols present. The steeping mixture can be hot centrifuged, stirred and/or crude filtered at 145° F. through a mesh filter and/or 50 um filter and/or 6 um filter and/or 1-10 um filter. The type of step taken with the mixture can vary for the type of product desired, and any one or more of centrifugation, decanting, settling or resting, cooling, press filtration, vacuum filtration, and membrane filtration can be selected. Furthermore, the steeped mixture or the steeping process can include or be partially comprised of any one or more of percolation, flow through a packed column, a series of packed columns, supercritical extraction, and continuous belt extraction. Filtration steps and filter aids used, at this or any other step, can include one of more of polyester filters, teflon filters, polypropylene filters, polyvinylidenedifluoride filters, polyethersulfone filters, cellulose filters, cellulose and diatomaceous earth filters, sand, silicates, vermiculite, diatomite, perlite, diatomaceous earth, cocoa shells, nut shells, and cocoa nibs. Thus, the methods of the invention can include a mechanical separation step with a filtration step, in any order, or one or the other of mechanical separation or filtration. The crude filtered, steeped cocoa water can optionally then be cooled and centrifuged at about 7000 rpm for about 10 minutes, or from 1 to 30 minutes, or at various other speeds and/or for different periods of time. It can also be hot centrifuged. The pH can be, or again be, adjusted, for example with citric, phosphoric, or ascorbic acid to about 6.0 or below, or about 6.5 or below, or about 4.6 or below, or about 4.0 or below, or between about 3.0 and 4.0. Then a 1 um microfiltration step can be used and the product sealed or stored in a sterilized container or diluted with sterilized water and then stored or sealed in a container. Multiple filtration steps or the use of a 1 um or smaller filter can be used, but the total polyphenol content of cocoa water is reduced with additional filtration. The containers can then be heat treated for later use.

For the cocoa beverages of the invention that may contain high concentrations of polyphenol or flavanol compounds, in particular catechins and epicatechins, advantageous embodiments of the invention prevent the oxidation of these compounds with metal ions, such as calcium, magnesium, aluminum, zinc or iron, and dissolved oxygen. Oxidized polyphenols may also gradually bind to other components and result in changes in color, clarity, or form a sediment. Any of the conventional or available manufacturing processes to prevent the occurrence of oxidation and sediment can be employed. For example, any of the following can be tested or used with the cocoa beverages of the invention: removing causative substances by filtration, such as membrane filtration, ultrafiltration, microfiltration or diatomaceous earth or perlite filtration; adding complexing agents, emulsifiers, or ascorbic acid and sodium bicarbonate, or actively precipitating the causative substances followed by filtration; adding chemicals or enzyme reagents to solubilize or stabilize insoluble complexes; and adsorbing and/or removing metal ions by chromatographic or ion exchange treatment. In particular, the filtration or membrane filtration or ultrafiltration membrane with a molecular weight cut-off barrier of between about 10,000 to about 100,000 can be used, or a membrane that removes particles of about 10 um or less or about 5 um or less, or about 1 um or less. Clarifying beverages by adding acid or buffering solutions is known in the art, where acidifying or buffering agents are used, rapid cooling, centrifuging, and then filtrating with diatomaceous earth is an option. Also, centrifuging or cloth-filtering the warm-water extract and combining with a process adding an enzyme is known in the art and can be used.

The water for steeping can be selected to optimize particular effects and hard water, soft water, ion-exchanged water, distilled water, carbon filtered water, spring or natural water, aqueous solutions containing acids, such as citric acid or ascorbic acid, or pH-adjusted or buffered water can all be selected. Several steeping steps where a cocoa water composition is again steeped in a cocoa bean composition can also be performed. Since certain cocoa polyphenols and flavanols can be effected by pH and the steeping water used, pH of the water can be maintained or adjusted, for example to be in a particular range. In preferred aspects, the pH range can be a pH of 7.1 or less, a pH in the acidic range, or from about 6.5 to about 4.5, or about 6.5 or below, or about 6.0 or below, or about 4.0 or below, or about 3.5 or below, or between about 3.0 and 4.0. In one example, as the pH increases the deterioration of catechin occurs more readily over time, it may be preferable to adjust the beverage to a pH between about 6.5 and about 7.0, or below about 7. The pH of the final finished product can also be adjusted, and preferred examples include a pH between pH 3 and pH 4, especially preferred is pH 3.5. Carbonation processes can also be employed on the final finished product to produce a carbonated beverage.

In general, a non-pressurized process is preferred, however, certain steeping or brewing devices and methods can be used where the water and cocoa product used in steeping are under pressure can be selected. A variety of pressure ranges are known to and can be used by one of skill in the art in any of the embodiments of the invention. Furthermore, percolation and packed columns using cocoa products can be used. Modified packets of the invention can even be designed for use in pressurized devices, such as cappuccino or espresso machines. Many packets and sealed containers containing packets or the interior of the packet components are known in the art and can be considered in conjunction with this invention.

The temperature of the steeping water may also effect the content of the final beverage. A variety of temperature ranges can be tested and used, including from about 20° C. (or about 68° F.) to about 100° C. (or about 210° F.), and more particularly from about 45° C. to about 100° C., or about 60° C. to about 90° C. A particularly preferred temperature range for producing high levels of cocoa polyphenols is about 140° F. to about 212° F., or about 165° F. to about 185° F. A cooling step and/or resting step can also be included, to reduce the temperature, to reduce the temperature and/or settle particulates, or to functionally permit the formation of fat crystals, before or after a mechanical separation and/or filtration step, to about 135° F. or below, or even 40° F. to about 104° F., if desired. After a purification or filtration step, the steeped water can be adjusted to a particular pH range, for example an acidic range of about pH 3 to about pH 4, or pH 4 to about pH 5, or a pH below 6 or below 7. Acids and acid salts can be added, such as citric acid, citrates or sodium citrates, phosphoric acid, lactic acid, ascorbic acid, ascorbates or sodium ascorbate can be added before, after, or at the same time of cooling or filtering the steeped water. Combinations of acids can also be used. By cooling or adjusting the pH or acidity of the steeped water or cocoa beverage, it is possible to prevent the oxidation of the polyphenols and/or flavanols, especially preferred polyphenols that have beneficial health effects in humans. Thus, the invention includes using any one or more of the following acids, any approved food acids, the salts of any of these acids, buffering agents, or co-solvents in the aqueous solution mixed with the cocoa product or as an additive to the steeped cocoa mixture: citric, malic, tartaric, fumaric, acetic, ascorbic, sulfuric, benzoic, lactic, phosphoric, or sorbic acid, ethyl alcohol, sodium acid sulfate, glycerol, propylene glycol, triethyl citrate, triacetate, benzyl alcohol, and vegetable oils. Alternatively but not necessarily, catalysts can be added to aid in the stabilization of the cocoa butter in the presence of a molecule that contains an alcohol group and one that contains an acid to lower the pH. These catalysts can include phosphoric acid, sodium acid sulfate, sulfuric acid, sodium carbonate, zinc acetate and the like. Such catalysts can be added at about 0.01 to 1.0% of the weight of the reactants (the cocoa butter and molecule that contains an alcohol), or more preferably 0.03 to 0.5%. Citric acid and lactic acid are examples of a molecule that contains both an alcohol and acid groups, although citric acid is a preferred embodiment. The preferred solution for steeping is a purified water.

For the optional filtration process, one embodiment is to carry out a crude filtration to remove particulate residue, such as cacao bean particulates, large or fine cocoa powder particles, and optionally to carry out a filtration to remove substances that cause sediment to form during storage. The optional filtration step or even multiple filtration steps can be implemented anywhere and at any time in the manufacturing process. While the filtration or centrifugation steps may be optional in certain embodiments, one or more of the specific filtration, purification, centrifugation, or other exemplified steps for removing particulates or purifying a beverage can be the exclusive step(s) used for certain, preferred embodiments. For example, a filtration and/or centrifugation step is used and no other methods to filter, isolate, or purify a beverage composition from particulates or remove other cocoa or ingredient compounds are used. Or a filtration and/or centrifugation step is/are used to purify cocoa components from a steeped cocoa water composition. In a crude filtration step, any of a variety of filters and filtration devices known or available in the art can be selected, including those using a cloth or flannel filter, a stainless steel filter, a strainer, and combinations of these. Microfiltration and ultrafiltration can also be used, as known and available products and methods for one of skill in the food and beverage art appreciates. As noted above, diatomaceous earth filtration and other appropriate membrane filtrations can also be selected and used alone or with any of the methods, steps or devices noted above or known or available in the art. As well as membrane filtration, separations such as microfiltration, ultrafiltration, reverse osmosis membrane filtration, electro-dialysis and bio-functional membranes can also be selected or tested, alone or in combination with the above-mentioned steps or other available steps. As noted above, the separation step or mechanical separation step can be used alone, as the exclusive step, or in combination with a filtration step, and a filtration step can be used alone or in combination with a separation step.

In addition or in the alternative, centrifugation steps or methods may be used. In one example, centrifugation may be carried out and it is preferable to cool the steeped water or cocoa composition before and/or during centrifugation, for example to about 40° F. to about 104° F. Centrifugation can also be combined with a diatomaceous earth filtration, or other filter aids like perlite, vermiculite, or diatomite, as centrifuging before filtration can reduce the filtration time, or increase the life of the filter.

For the final product formulation process or manufacturing process of a beverage of the invention, various properties can be controlled for or adjusted, for example, the pH, the concentration of the cocoa component of the beverage and the concentration of the cocoa polyphenols and/or cocoa flavanols, the taste, the sweetness, and the mouthfeel. For example, color variations can be produced by changing the steeping time and/or by mechanically stiffing or mixing the cocoa product-aqueous solution mixture. The addition of one or more of the following types of products can be selected or tested in preferred aspects of the invention: the addition of more water (hard water, soft water, ion-exchanged water, spring or natural water, carbonated water, and other waters), citric acid, ascorbic acid, sodium ascorbate, sodium bicarbonate, sugars, sweetener, sugar alcohols, saccharides, dextrins, carrageenans, flavors, emulsifiers, beverage stabilizers, stabilizers or other seasoning agents or flavoring agents. As noted, food approved acids, or food approved salts of acids, such as those approved for use by the U.S. FDA in foods and beverages, can be used to adjust the pH and can be used for other purposes, such as flavoring.

An optional heat-sterilization process can be used before or after filling product containers. Filling at sterilizing temperatures like about 121° C. and/or treatment at 121° C. for 7 minutes under an appropriate pressure for certain beverages and container, especially cans, can be used. Tunnel pasteurization at about 15 minutes or by spraying with water at 140-175° F. can be used to sterilize. Ultra high temperature (UHT) sterilization can be used, and optionally keeping the beverage at between about 120 to about 150° C. for one second to several tens of seconds for certain beverages and containers, including plastic bottles.

As mentioned above, various dietary additives, supplements, minerals, and vitamins, and herbal or botanical and ingestible elixirs and/or extracts can be added to the cocoa formulations or compositions of the invention, or used in the methods. In particular, a bitter blocker agent or agents can be used. In one such example, an adenosine monophosphate compound can be selected, but any bitter blocker agent or compound, one or more mouth-watering agents, and/or one or more sweetness enhancers, as well as flavor agents and beverage flavor agents known or available can be selected. For those employing an appetite suppressant, in general, these compounds or compositions or extracts decrease the desire for food for a period of time. Commercially available appetite suppressants include, but are not limited to, amfepramone (diethylpropion), phentermine, mazindol and phenylpropanolamine fenfluramine, dexfenfluramine, and fluoxetine. Various peptide and polypeptide compounds have also been tested and/or suggested for this purpose, including, but not limited to, Neuropeptide Y, PYY, pseudo-peptides, CCK, and fragments thereof. Various plant and herbal extracts have been tested and suggested also, including, but not limited to epigallocatechin gallate from green tea extracts and green tea extracts themselves; *ginseng* or *ginseng* extracts; theobromine and high doses of theobromine, "high" meaning over 250 mg. per day, preferably over 1000 mg. per day; ephedrine; cinnamon bark extracts; and caffeine.

Additional food ingredients or edible ingredients can be combined with any of the compositions and combinations of the invention. Especially preferred are one or more of the GRAS (generally recognized as safe) flavoring agents available or known. Organic sweeteners, such as sugars of organic can juice, can also be used.

Available nutritive or carbohydrate sweeteners that can be selected and used in the beverages, alone or in any combination, include sucrose, dextrose, fructose, liquid fructose, lactose, maltose, glucose, trehalose, oligofructose, inulin, agave syrup, corn syrup, invert sugar, honey, cane syrup, maple sugar, brown sugar, and molasses, for example. Furthermore, artificial or non-nutritive sweeteners can be used in the invention, or in total or partial replacement of nutritive sweeteners, to produce low calorie or low carbohydrate products or sugar-free products. Examples of sweeteners include, but are not limited to, Acesulfame potassium (Ace-K), sucralose, maltitol, xylitol, erythritol, mannitol, sorbitol, lactitol, isomaltulose, powdered hydrogenated glucose syrup, aspartame, neotame, cyclamate, saccharine, glycyrrhizine, dihydrochalcones, stevioside, thaumatin, monellin, neohesperidine, any of the polyol compounds, and any available natural products of plants, such as glycosides and specifically stevioside and rebaudioside A, and any combination of two or more of these sweeteners. A preferred polyol or sugar alcohol is xylitol, but any others can be selected, alone or in any of various combinations possible, from, for example, erythritol, mannitol, sorbitol, and maltitol. Sugar substitutes, as known and available in the art, can also be used, alone or in various combinations.

Thus, in any embodiment of the invention, a sweetener or sweetener composition can be used. For example, sucralose and neotame are two preferred sweeteners that can be used alone or in combination. The non-nutritive, high-intensity sugar substitutes in general can also be used, including aspartame, Ace-K, cyclamate, and alitame. Other sugars than can be used in any embodiment of the invention include sucrose, fructose, liquid fructose compositions, especially liquid fructose at about 90% in water, and corn syrups, and combination of these.

Similarly, in any embodiment of the invention one or more sweetness enhancers can also be used, such as vanillin, vanillyl-n-butyl ether (VBE), and other compounds available in the art. Especially preferred are sweetener and/or enhancer combinations with sustained sweetness or lingering sweetness characteristics.

Some of the preferred beverages and concentrates are low calorie products, and thus sugar substitutes and sweeteners are preferred, especially in producing products with a per serving calorie count of less than or about 100 calories, or less than or about 70 calories, or less than or about 60 calories, or less than or about 50 calories, or less than or about 40 calories, or less than or about 30 calories, or substantially zero calories.

Preservatives and similar functional compounds and compositions and stabilizing agents, emulsifiers or beverage stabilizers, can also be used in the beverages and compositions concentrates, or in mixing the concentrates into a ready-to-drink beverage.

As noted, the final finished products can contain one or more health or functional compounds available in the art. Many such functional compounds and the health conditions or tissue they intend to improve or effect have been described. The Examples below detail some preferred functional combinations. However, many others are possible. A non-limiting list of the functional effects, tissue to be effected, and the proposed compounds or extracts or ingredients that can be selected from, in any combination, follows: Skin Health/Beauty: Calcium; Chromium; Selenium; Zinc; Ascobyl Pulminate; Magnesium; L-Carnitine; N-Acetyl-L-Carnitine; L-Glutamine; Collagen Hydrolysate; Tumeric; DMAE (dimethylaminoethanol); Green Tea; Grape Seed; Alpha Lipoic Acid; Aloe Vera extract; CoenzymeQ10; Walnut; Pomegranate; Botanical Gelatin; Polyphenols; Flavanoids Sleep: Melatonin; L-Theanine Cholesterol: Policosanols Mental Renewal/Brain Function/Memory: Vinpocetine; *Ginkgo Biloba*; L-Arginine; Acetyl-L-Carnitine; Theobromine; Feverfew; DMAE (Dimethylaminoethanol); DMAE bitartrate; P-chlorophenoxyacetate Bone: Coral Calcium; Magnesium; Vitamin K; Boron Digestive: Tarragon oil; Amylase; Proteases; Lipase; Cellulose; Pectin; HCL; Sucrase; Maltase; Lactase; Probiotics Energy: Vitamin B-Complex; *Ginseng; Ginkgo Biloba*; Caffeine; Theobromine Hormone: DHEA (Dehydroepiandrosterone); Pregnenolone; Melatonin Enhancing Lilipolysis/Weight Loss: *Hoodia Gordonii; Gymnema Sylvestre*; Hydroxycitrate: Green Tea Leaf Extract; Betaine; Piperine; Potassium; Maltodextrin; Vitamin C; Vitamin E; Thiamin; Riboflavin; Niacinamide; Pyridoxine Hydrochloride; Biotin; Chromium; Molybdenum; *Garcinia Cambogia*; Congugated Linoleic Acid (CLA); Glucosol; Guarana; Hawthorn; ECGC (epigallocatechin-3-gallate)

Prostate: Nettle Root; Saw Palmetto; Pygeum; Lysopene

Joint: MSM (dimethylsulfone); Glucosamine Chondroitin

Liver Detox: N-Acetyl Cystene; Milk; Thistle; Green Tea; Alpha Lipoic Acid; Red Clover Multi-Vitamin: Vitamins A, C, D3, E, B1, B2, B3, B6, B12; Folic Acid Pantothenic Acid; Biotin; Calcium; Iodine; Magnesium; Zinc; Selenium; Manganese; Chromium; Molybdenum; Potassium; Inositol Immune: Green Tea Extract; Colostrum; Indole 3 Carbonal; shitake Mushroom; Grapefruit Seed Extract; Beta 1-3 Glucon Eye: L-Taurine; N-Acetyl Cysteine; Alpha Lipoic Acid; Bilberry; Lycopene; Astazanthin; Lutein Heart: Alpha Lipoic Acid; Co-Enzyme Q10; Grape Seed Extract; Hawthorne Extract; L-Taurine Male Libido: L-Arginine; *Muira Puama; Avena Sativa*; Tribulis Terristris; Choline; *Ginkgo Biloba*

Female Libido: Pantothenic Acid; L-Arginine; *Muira Puama*; Maca Root; *Avena Sativa*; Dong Quai; Choline; *Ginkgo Biloba*

Mood: 5 HTP (5-Hydroxytryptophan); L-Theanine; Theobromine

Post Memopausal: Black Cohash; Dong Quai; Chastertree Berry; Green Tea; Red Clover; Indole 3 Carbinol Body Building: Androstenedione; L-Glutamine; L-Tyrosine; L-Arginine; L-Glycine; L-Lysine; Whey Protein; DHEA (Dehydroepiandrosterone)

Antioxidant: Vitamin C; Vitamin E; Grape Seed; Alpha Lipoic Acid; Green Tea

Hangover: Pharmaceutical Charcoal; Calcium

In addition, plant sterols can be added or used, where plant sterols includes, without limiting to this specific list, phytosterols, phytosterol esters, phytostanols, phytostanol esters, and more particularly various positional isomers, stereoisomers, hydrogenated forms and/or phytostanol esters of the following non-limiting list of general plant sterols: sitosterol, campesterol, stigmasterol, spinosterol, taraxasterol, brassicasterol, desmosterol, chalinosterol, poriferasterol, clionasterol, avenosterol, and ergosterol. The above compounds or extracts containing them can be used alone or in any combination to provide two or more plant sterols or stanols for the composition or beverages of the invention.

Any of the aspects or embodiments of the invention can comprise or include formulations of the cocoa beverages from extracts, concentrates, cocoa powder, or cocoa-containing products that are freeze-dried, dehydrated, or otherwise dried. The dried or dehydrated product can then be used to produce a ready-to-mix product by adding water and optionally flavors and optionally carbonated water. The dried or dehydrated products can also be used in packets, alone or together with other components, and used in ready-to-mix beverages, powdered mixes, sugar-free mixes, calorie-free mixes, confections, chocolate, sugar-free chocolate, and/or baked goods or sugar-free baked goods. A concentrate can also be produced from the beverage product or composition by, for example, evaporation and spray drying. For final beverage preparation from a concentrate or dried product, water can be added and optionally flavoring agents, acids and/or buffering agents.

EXAMPLES

A low calorie beverage product (light brew)—1.27% cocoa powder in water is the concentration to be used for the steeping step. Water is heated from about 200 to 212° F. Cocoa is added and mixed for 5 minutes. The mixture is flash cooled to 130° F. It sits unagitated for 25 minutes. The temperature cools to 110° F. The liquid is removed from the top and the wet material on the bottom is pressed in a crude separation method. A polishing filtration step is next used, with a 6 micron filter, to remove the remaining liquid. This liquid is made into a finished product by adding sweetener (3.5% crystalline fructose), and citric acid (0.184% of a 50% solution).

A full-flavored product (rich brew)—3.6% cocoa powder in water is the concentration to be used for the steeping step. Water is heated from 200 to 212° F. and citric acid is added to the water (0.7% of a 50% solution). Cocoa is added and mixed for 5 minutes. The mixture is flash-cooled to 130° F. It sits unagitated for 25 minutes. The temperature cools to 110° F. Liquid is removed from top and the wet material on the bottom is pressed in a crude separation method. The final product is composed of 48.5% liquid extract, 41.5% added water, 10% liquid fructose. Preferred levels of sucrose are 1-8% and preferred levels of liquid fructose are 2-8%.

Acidified Cocoa Water—3.5% cocoa powder in water heated to 145 F with about 0.03% to about 0.04% citric acid powder added to about pH 3.8 to about 4.2. The mixture is stirred for 5 minutes and the hot product is centrifuged. Centrifugation can be up to approximately 15-30 minutes depending on the batch and type of cocoa product used. A concentrate or brewed cocoa water is obtained. Total antioxidants extracted are in the range of 60-70%. A significant portion of the antioxidants that are not extracted may be the insoluble fraction of the polyphenols. In general, the cocoa water has particles less than 5 microns. Table 4 below shows the total polyphenol content, the content of certain polyphenol compounds, and the measured ORAC activity of the cocoa water that can be prepared.

Filtered Acid Brew—Initial brewing step of 3.5% cocoa powder in water (carbon filtered with 0.5 micron filter) heated to 140° F. with about 0.35% citric acid powder added to produce about pH 3.8 solution for about 5 minutes. The pH during the brewing step can be about pH 3.8, and additional pH adjustment at a cooling step can adjust to pH 3.5. Various pH levels can be used or tested and the pH can vary from about 3 to about 4, but lower pH at about 3 do not have an optimum taste, and higher pH at about 4 can result in detectable fat ring in final product. The preferred final beverage pH is 3.5. The mixture can be stirred during the 5 minute brew period, and the hot product is centrifuged. As above, centrifugation can be approximately 15-30 minutes depending on the batch and type of cocoa product used, but centrifugation anywhere from 1 minute to about 30 minutes can be used. The solution is again adjusted to the desired pH, such as pH 3.5, and allowed to rest at 70° F. for at least 10 minutes, or between about 45 minutes to 2 hours. This solution is filtered through conventional cellulose, polypropylene, cellulose and diatomaceous earth, or polyester filter medium, as used in water purification or wine processing methods. Alternatively, the solution is allowed to rest at 70° F. for a desired period of time, then filtered, then adjusted to a desired pH such as pH 3.5. Various filter sizes can be used, including 1 micron, 5 micron, and 10 micron. Optionally, one or more filter aids can be added to the solution just before the filtration, such as perlite or diatomite. One or more filter aids can also or optionally be used prior to the hot centrifugation. This filtered, brewed cocoa water can then be used in mixing with other beverage ingredients, or concentrated. Optionally, an emulsifier can be combined with the brewed cocoa water, with gun arabic being the preferred emulsifier at a concentration that results in final product having about 0.5% gum arabic, or less than 0.5%, or between about 0.1% and about 0.05%. Optionally, a homogenization step can be used in combination with the added beverage emulsifier and/or weighting agent.

Phosphoric Acid Brew—The above method is used except that phosphoric acid can be used instead of citric acid. The pH again can vary, with pH 3.5 preferred. The use of phosphoric instead of citric acid can result in brewed product and final product with more cocoa notes in taste profile. Additionally, phosphoric acid can be used together with citric acid to titrate to pH 3.5 during the steps noted above.

Gum Arabic-Containing Cocoa Brew—An alternative to filtering is the addition of stabilizers, and/or emulsifiers, and/or weighting agents to the centrifuged brew followed by homogenization. Finished beverages made with this type of brew show little or no fat ring when held at ambient temperature over time. Gum arabic (gum acacia) is a preferred compound, and provides the best functionality and results in a clear finished beverage. Weighting agents can be added in combination with the gum arabic if a cloudy beverage is desired.

For example, 0.5% gum arabic is added to fresh, hot (90° F.-110° F.) centrifuged brew, mixed for 1 hour to maximize hydration, and acid adjusted to pH 3.8. The suspension is then processed through a conventional 3000 psi/500 psi two-stage homogenizer. When the emulsion is diluted 1:5 with a mixture of water and other typical beverage ingredients, and filled into glass, no fat ring forms on the surface.

High Acid Steeped Cocoa—1.2% citric acid powder is added to water at 120° F. to produce a solution of about pH 3.0 and titratable acidity of about 1.25%. Cocoa powder to 3.5% w/w is added to the acidified water once the water was heated to about 140° F. The solution is stirred for 5 minutes and the hot product is continuously centrifuged at about 9400 rpm. The solution is mixed with other beverage ingredients within 30 minutes and hot filled into glass bottles. This product is stable and has noticeably reduced surface fat ring compared to process with no acid added.

Removing Fat Ring Using Catalysis—Citric acid 0.35 pounds and 11.34 grams of 70% phosphoric acid solution are added to 96.15 pounds of water preheated to 120° F. The solution is heated to 140° F. and 3.5 pounds of cocoa powder is added. The suspension is agitated for 5 minutes and then centrifuged through a continuous centrifuge. The centrifugate is then diluted 1:5 w/w with water and adjusted to pH 3.3 with citric acid, pasteurized and bottled. The beverage showed improved stability compared to the control without phosphoric acid and the fat ring was less evident.

Comparison of Acid Brew/Steep Conditions and Cocoa Fat Ring in Container—various samples of 3.5% natural cocoa powder in water are tested by adjusting the level of acid, for example citric acid, used during the brew or steeping step. The cocoa powder is steeped at 140° F. for 5 minutes, with or without stirring.

TABLE 1

| Sample | Acid in Feed Tank (Water + Acid + Cocoa) (% Citric) | Degree of fat ring after ambient storage (visual evaluation) | Acid Added to Filtered Steeped Cocoa (% Citric) | pH Final |
|---|---|---|---|---|
| A-5 | 0 | **** | 0 | |
| A-1 | 0 | **** | 0.35 | 3.8 |
| A-0 | 0.35 | *** | 0 | 3.8 |
| A-2 | 0.35 | ** | 0.65 | 3.2 |
| A-3 | 0.35 | ½* | 0.85 | 3.2 |
| A-4 | 1.2 | * | 0 | 3.0 |

Table 1 shows that when no citric acid is used during the steeping process, a large and visible fat ring forms on the container holding the cocoa water composition. Reducing the pH by the addition of citric acid, for example, and down to a pH of about pH 3, effectively reduces the potential to produce a fat ring on the storage container or surface of the beverage. Without, limiting the scope or purpose of the invention, the acid present may create an interesterification reaction with the fat present, which is easily filtered out during the a centrifugation or filtration step prior to filling the storage container. The pH can also be adjusted after filtration step and/or prior to filling in storage containers to reduce the fat ring-depositing potential.

TABLE 2

| Final adjusted pH | Final Titratable Acidity (% as citric) |
|---|---|
| 3.7 | 0.08 |
| 3.8 | 0.08 |
| 3.8 | 0.11 |
| 3.2 | 0.18 |
| 3.2 | 0.23 |
| 3.0 | 0.23 |

Optional final, adjusted beverage pH and/or the titratable acid acidity of exemplary samples are shown in Table 2 above.

Acid in Steep and Final Fill—same cocoa brew conditions as above are tested for taste characteristics at various pH condition and pH adjusting points. For example, adding citric acid to water during steeping process and/or adding citric acid to the final product prior to fill can effect taste profile. While citric acid used here, other acid and acid salts, as noted above, can be used, especially phosphoric and lactic, and any and all combinations of acids or acid salts can also be used.

TABLE 3

Impact of Citric Acid on Flavor

| | Sample | | | |
|---|---|---|---|---|
| | A | A2 | A3 | A4 |
| Citric in feed | 0.35% | 0.35% | 0.35% | 1.21% |
| Citric in brew | 0 | 0.65% | 0.85% | 0% |
| Final pH | 3.8 | 3.2 | 3.2 | 3.2 |
| Sourness | 4.5 | 5.7 | 6.1 | 6.1 |
| Sweet | 8.4 | 7.5 | 7.0 | 6.8 |
| Astringency | 4.2 | 4.9 | 5.1 | 5.4 |
| Cacao | 3.1 | 3.2 | 2.7 | 2.5 |

The results in Table 3 compare four different acid parameters—A=adding citric acid to the water in feed tank prior to contacting cocoa for steeping; A2=adding citric acid at both feed tank and after the filtering of the brew/steep process; A3 adding citric acid in both feed tank and after filter of brew/steep process, but at different concentrations; A4 adding citric acid in feed tank but at different concentration. The "Final pH" here is the finished beverage pH. The scale for taste characteristics is 1-9 (sourness; sweetness; astringency; cocoa flavor notes). As shown, the flavor profile of the cocoa water composition can be manipulated for a variety of beverages and desired processing steps.

TABLE 4

| Analytical Measure | Cocoa Powder Std (per gram) | Theoretical Level in Water (per ml) | Cocoa Water-Actual (per ml) | Extraction Efficiency |
|---|---|---|---|---|
| Total Polyphenol mg | 62.46 | 2.18 | 1.02 | 47% |
| ORAC UMTE/g | 711 | 24.88 | 16 | 64.3% |
| Monomers | 4.36 | 0.15 | 0.11 | 73% |
| Dimers | 4.20 | 0.147 | 0.10 | 68% |

In the Table 4 above, in each case a 3.5 g sample of cocoa powder per 100 ml of water is used to make the cocoa water according to the "Acidified Cocoa Water" example above. A "Theoretical Level" for the total polyphenols present (mg/g of the cocoa powder as Gallic acid equivalent, or mg/ml in the cocoa water calculations or data), the ORAC activity present (uMolar per Trolox equivalent—UMTE per gram) and the polyphenol monomers (mg) and polyphenol dimers (mg) present based upon the known levels in the cocoa powder (the known levels from cocoa powder is listed in "Cocoa Powder Std (per gram)" in the second column). The "Cocoa Water-Actual per ml" represents actual measurements of the levels in the cocoa water (3.5 g cocoa powder/100 ml water) used, and the "Extraction Efficiency" represents the ratio of actual measured values to the theoretical levels. Total Polyphenols and ORAC can be measured by standard methods available, and polyphenol monomers and dimers can be measured by HPLC or other quantitative chromatography methods.

The purified cocoa water compositions described here can be produced by methods to retain or preserve certain levels of the total polyphenols, ORAC activity, polyphenol monomers, polyphenol dimers, or other subsets of polyhenols present from the cocoa product or cocoa bean product used to make the steeped cocoa water. In particular examples, over about 40% of the total polyphenols can be retained or preserved, or from about 50% to about 70%, or about 30% to about 50%. Similarly, about 60% to about 70% of the ORAC activity present can be retained or preserved. Also, about 50% to about 80% of polyphenol monomers or dimers can be retained or preserved, or about 60% to about 70%, or about 50% to about 60%, or more than 50%. Alternatively, 1 mg/ml or more, or 1.5 mg/ml or more, or 2.0 mg/ml or more, or greater than 2 mg/ml, for example, of cocoa total polyphenols can be present in the cocoa water composition that is used, or diluted, into a final finished product. As noted herein, filtering methods, the number of filtration steps used, the pH level used at points in the process, the temperature used at points in the process, the length of time spent at high temperatures, and concentration methods used can all effect, alone or in combination, the levels of these compounds or subsets of compounds in the purified cocoa water composition or in the final beverage composition.

Method for manipulating color, richness, and total polyphenols—The efficiency of the filtration process is improved by heating the cocoa bean composition/water to about 200° F., letting it sit for 5 mins, flash cooling to 130° F., whereby the cocoa solids fall out of solution. A filtration process using, for example a 10 micron or less filter, or a 6 micron filter to about 1 micron filter, and a press can efficiently produce a steeped cocoa beverage product. Varying the temperature of the steeping and adding an agitation or stirring method to the steeping can change the color, flavor and total polyphenol content. A steeping temperature of 212° F. results in a bitter product. A temperature range of between about 165° F. and 185° F. results in the highest levels of cocoa polyphenols, and higher shear stresses during stirring or agitation can all result in higher polyphenol content. Approximately 85% of the total polyphenols can be made into the beverage product by a process at 170° F. for about 30 seconds mixing time. A pink colored-product results when an aqueous solution of about pH 4 or below is used with a cocoa bean composition from an unroasted, unfermented cocoa bean, whereas the neutral or substantially neutral water produces a brown color. Cocoa powder as natural cocoa powder, dutched cocoa powder, non-fat cocoa powder, defatted cocoa powder, and mixtures with no fermentation and/or no roasting or low roasting conditions for the cocoa beans of the cocoa powder can be selected, alone or in any combination of available cocoa powders, for any of the embodiment of the invention or the examples herein. As noted, about 3.5% cocoa powder in the brewing step is preferred, but concentrations as high as about 8% cocoa powder can be selected and used, as well as lower concentrations.

Tea type product—cocoa water may be added in the range of 10-50% of the final beverage. One specific example uses about 20% cocoa water. Liquid fructose is added at 5.5%, sugar (sucrose) is added at 3% and antioxidant extracts or boosters, such as white tea or green tea extract, may be added at 0.02-0.05%. The tea extract at about 0.1% creates an astringent, tea-type flavor. In this example, black tea extract competes with the cocoa flavor and is not desirable. White tea is preferred because of its bland flavor. In addition, flavors or masking agents and sweetness enhancers may be added, and flavors or masking agent levels can be more important when the cocoa water content is above 10%, but may not be desired at 10% or less. In addition, combination of acids creates differences in flavor perception. While citric acid is the preferred acid, the addition of other acids, such as phosphoric acid or lactic acid, increases the cocoa flavor perception. Citric acid is also preferred when combining the cocoa water with a citrus fruit extract or juice. Malic acid is preferred when stone fruit extracts or juices are used, such as pear, peach, or passion fruit. A tea-type product may also be made using a concentrate. A cocoa concentrate made from a specific bench top concentrating unit can be used to make the tea-type product. In this case, 10% concentrate is used in the final beverage. The concentrate flavor profile is different then the cocoa water brew due to its lower astringency. Larger particle size cocoa particles are desirable when using a bench-top concentrating unit (for example, Toddy Products; Houston, Tex.). The tea-type product referred to here is especially useful in producing beverages with acceptable astringency levels and/or with low calorie levels, such as a 50-70 calorie 8 oz. drink.

Enhanced Water product—a cocoa water can be used at about 2.7% in the final beverage. Cocoa water brew may also be made from unfermented beans, which provides a light pink colored beverage at pH below 4. Flavors may be added and antioxidant boosters or extracts or elixirs may be added. This product may be lightly sweetened using powdered fructose at 1.5%. One example employs the addition of a cocoa antioxidant elixir at a level ranging from about 0.5 to about 1%. The water may be acidified to below pH 4.0 and hot filled. Another example of a water-type product can be made from brewed cocoa nibs. Nibs are added to boiling water, brewed for 1-2 minutes and immediately filtered out using a filter screen. Nibs at an optimum addition level is 2.5% weight/weight. Adding nibs at 5-7% level causes fat separation. Vanilla beans may be added to the nibs to obtain a unique chocolate-flavored water. Using different nibs from cacao beans grown in different regions of the world provide very different flavor profiles to the water. The product may or may not be sweetened. A particular unsweetened product is a zero calorie product. In general, this unsweetened product cannot be acidified and a preferred production process will use an aseptic filling process.

Fruit cocktail type product—in this example, cocoa water brew may be added at 18% of the final beverage. Liquid fructose at 3.3% and sugar (sucrose) at 1.2% is added to provide sweetness. Juice blends as concentrates may be added at different concentrations depending on specific functional benefits. One example is a product targeted towards heart health, where the juice blend is a comprised of a blend of apple juice at 2%, black currant at 3%, and concord grape at 7%. Black currant is naturally high in Vit C. In addition, a heart healthy vitamin blend comprised of 30% Vit E and C and 10% of B6, B12 and 10% potassium based upon the U.S. RDI is added. Plant sterol extracts or preparations and/or reservatrol can also be added for heart health products, or where fruit pulp is present in the final beverage, such as in an orange juice or apple juice combination. In a product targeted towards immunity or defense from disease, the juice blend may be changed to clarified orange juice at 4.5%, and juices such as white grape concentrate and apple at 2.35% and 2.46% respectively. In addition, Vit E at 50%, Vit C at 100% and Zn at 10% may be added. In a product targeted towards detoxification benefits, apple at 1.96%, white grape at 1.41%, and concord grape at 1.23% along with pomegranate at 1.97% is added. In another example for a product targeted toward cognitive focus, in addition to vitamins such as Vit A, C and E at 20%, choline may be added. In all of the above examples, maintaining the juice level at about 40% can be important if an overall refreshing juice profile is desired. Additional examples of these beverages are noted below.

Energy drink type product—in this example, cocoa water may be used in the range of 30-50% of the final beverage, and preferred is 35%. Liquid fructose is added at 9% and sugar (sucrose) added to 2%. Brewed black tea or black tea extract is added for its antioxidant benefit as well as its flavor profile, which provides a complexity to the cocoa flavor. A blend of energy providing vitamins, such as Vit B5, B3, B6 and B12 may be added, which is an energy blend commonly used in energy drinks available. In addition, guarana can be added to add some caffeine or stimulant. Caffeine is also present in the black tea and the cocoa brew. In addition, slower-acting stimulants, such as theobromine and theophylline, are also present from the cocoa water brew and tea. The addition of liquid fructose and sugar also provide a sustained energy release. A preferred embodiment of this example employs standard carbonization procedures to produce a final product that is carbonated.

Heart Health Beverage

A cocoa water as described above in the light brew or rich brew can be used in combination with juices, extracts, concentrates, vitamins, minerals, and nutriceuticals to produce a beverage designed to maintain or improve heart health or atherosclerotic conditions. A number of antioxidant containing products have suggested such a use in the past. The combination of the cocoa antioxidants with other compounds adds additional health benefits.

In one example of a heart health beverage, the cocoa water (at about 30%-60% of total by weight) is combined with about 3% black currant concentrate or juice, about 2% cranberry concentrate or juice, and about 7% concord grape concentrate or juice. The resulting beverage contains an RDI of vitamin E of 30%, vitamin C of 30%, vitamin B12 of 12%, vitamin B6 of 10%, and potassium of 10%. The vitamins, amino acids, and minerals can be added as supplements, but some percentage can be provided through the fruit/berry juice or concentrate used.

Detoxification Beverage

In one example of a detoxifying beverage which can, for example, be consumed after strenuous exercise or other activities, the cocoa water (at about 30%-60% of total by weight) is combined with about 2.9% apple concentrate or juice, about 1.4% white grape concentrate or juice, about 2% pomegranate concentrate or juice, and about 1.2% concord grape concentrate or juice. The resulting beverage contains an RDI of vitamin A of 30%, vitamin C of 30%, vitamin E of 30%, and contains L-arginine. The vitamins, amino acids, and minerals can be added as supplements, but some percentage can be provided through the fruit/berry juice or concentrate used.

Cognitive Focus Beverage

In one example of a beverage to promote focus or cognitive focus, the cocoa water (at about 30%-60% of total by weight) is combined with about 3% apple concentrate or juice, about 2% concord grape concentrate or juice, about 1.4% pomegranate concentrate or juice, and about 2% white grape concentrate or juice. The resulting beverage contains an RDI of vitamin A of 20%, vitamin C of 20%, vitamin E of 20%, and choline of 25%. The beverage can also contain ginko bilabo and/or grape seed extract. The vitamins and minerals can be added as supplements, but some percentage can be provided through the fruit/berry juice or concentrate used.

Disease Prevention or Defense Beverage

In one example of a defense, health preservation, immune stimulation, or disease prevention beverage, the cocoa water (at about 30% total by weight) is combined with about 4.5% orange concentrate or juice, about 2.4% apple concentrate or juice, and about 2.3% white grape concentrate or juice. The resulting beverage contains an RDI of vitamin E of 50%, vitamin C of 100%, and potassium of 10%. The beverage can also contain *echinacea* extract. The vitamins and minerals can be added as supplements, but some percentage can be provided through the fruit/berry juice or concentrate used.

Certain examples of the final beverage products that can be filled in single size containers of about 8 oz., 10 oz., 12 oz., or 14 oz., contain about 100 to about 300 mg of total polyphenols and/or about 1500 to about 4000 ORAC activity units.

The examples presented above and the entire content of the application define and describe examples of the many cocoa beverages, concentrates, compositions, products, and methods that can be produced or used according to the invention. None of the examples and no part of the description should be taken as a limitation on the scope of the invention as a whole or of the meaning of the following claims.

What is claimed is:

1. A method of producing a cocoa beverage comprising selecting an amount of cocoa product in the form of one or more of a cocoa bean extract, cocoa bean concentrate, cocoa powder, cocoa kibble, or a cacao nib composition, to mix with a desired amount of water,
mixing the water and cocoa at a temperature above 68° F.,
adjusting the pH of the water or mixture with one or more of citric acid or ascorbic acid
separating insoluble particles from the mixture,
and purifying or filtering the separated mixture, whereby the mixture is capable of being stored at room temperature for at least a month without separating.

2. The method of claim 1, wherein the temperature is above 160° F.

3. The method of claim 1, further comprising adding one or more of a bitter blocker, a carageenan, an emulsifier, a preservative, an appetite supressant, theobromine, caffeine, a vitamin, a mineral, a sugar alcohol, ace-K, aspartame, or a sugar.

4. A method of making a beverage concentrate comprising the method of claim 1, and further comprising spray drying or dehydrating the mixture to produce a concentrate.

5. A method of producing a beverage from the concentrate produced in claim 4, comprising adding water to the concentrate and optionally adding one or more of a sweetener and a flavoring agent.

6. A beverage produced from the method of claim 1 comprising mixing a cocoa nib composition with an aqueous solution at a temperature above 160° F., flash cooling the mixture to about 130° F. or below, and filtering the mixture to produce a beverage composition, whereby substantially all of the total fat present is removed from the beverage composition.

7. The method of claim 1, wherein the pH is adjusted to 4 or below prior to filtering the mixture.

8. The method of claim 1, further comprising adding one or more flavoring agents and filling the mixture into a container.

9. The method of claim 1, wherein the cocoa product comprises a cocoa powder from unroasted cocoa beans with less than 3% fat.

10. The method of claim 1, wherein the cocoa product comprises a cocoa powder from unfermented cocoa beans.

11. The method of claim 1, wherein the cocoa product comprises a natural cocoa powder.

12. The method of claim 1, wherein the cocoa product comprises cocoa kibble.

13. The method of claim 12, further comprising adding one or more of a bitter blocker, a carageenan, an emulsifier, gum arabic, a preservative, an appetite supressant, theobromine, caffeine, a vitamin, a mineral, a sugar alcohol, ace-K, sucralose, aspartame, a fruit juice or extract, or a sugar.

14. The method of claim 1, wherein the pH is adjusted to a pH of between about pH 3.2 to about pH 3.8.

15. A nutritionally fortified, cocoa-based beverage produced from the method of claim 1, further comprising: an edible juice or extract; one or more natural or artificial flavors; and one or more nutritional vitamins, minerals or supplements.

16. The beverage of claim 15, wherein the edible juice or extract is selected from the juice, extract, essence, or a concentrate of one or more of the following: citrus fruits; berries; vegetables; orange; lemon; lime; tangerine; mandarin; grapefruit; acerola; grape; pear; passion fruit; pineapple; banana; apple; cranberry; cherry; raspberry; chokeberry; peach; plum; grape; grapeseed; noni; currant; black currant; cranberry; blackberry; blueberry; raspberry; pomegranate; acai; goji; strawberry; mirabelle; watermelon; honeydew; cantaloupe; mango; papaya; botanical extracts derived from cola; tea; white tea; green tea; coffee; vanilla; almond; vegetables; tomato; cabbage; celery; cucumber; spinach; carrot; lettuce; watercress; dandelion; rhubarb; beet; cocona; guava; and han guo.

17. The beverage of claim 15, wherein the one or more nutritional vitamins, minerals, or supplements is selected from: vitamins A, B12, B6, C, D, and E, coenzyme Q10, amino acids, L-arginine, taurine, choline, fermented barley extract (FBE), niacin, citric acid, hydroxycitric acid, gamma amino butyric acid (GABA), potassium, calcium, zinc, and chromium.

18. The beverage of claim 15, further comprising a nutritive or non-nutritive sweetener.

19. The beverage of claim 15, wherein the one or more nutritional vitamins, minerals, or supplements is selected from: caffeine; guarana; theobromine; and theophylline.

20. The beverage of claim 15, wherein the level of total polyphenols present in the cocoa-based beverage is about 40% or more of that present in the corresponding amount of cocoa powder used in preparing the brewed cocoa water composition.

21. The beverage of claim 15, wherein the level of polyphenol monomers or dimers present in the cocoa-based beverage is about 50% or more of that present in the corresponding amount of cocoa powder used in preparing the brewed cocoa water composition.

22. A method of producing a cocoa beverage comprising: mixing a cocoa extract, cocoa powder, or cacao nib composition with water; adjusting the pH to pH 4 or below; separating the water soluble components from the solids and separating or purifying the water soluble components into a cocoa water composition; mixing a fruit juice or extract with the cocoa water composition; and adding natural or artificial flavors and one or more supplements, vitamins or minerals, wherein the cocoa beverage is capable of being stably stored for over a month at room temperature.

* * * * *